May 13, 1924.
E. A. GRAFSTRÖM
1,494,065
FRICTION REGULATOR FOR WINDING DRUMS
Filed May 11, 1922
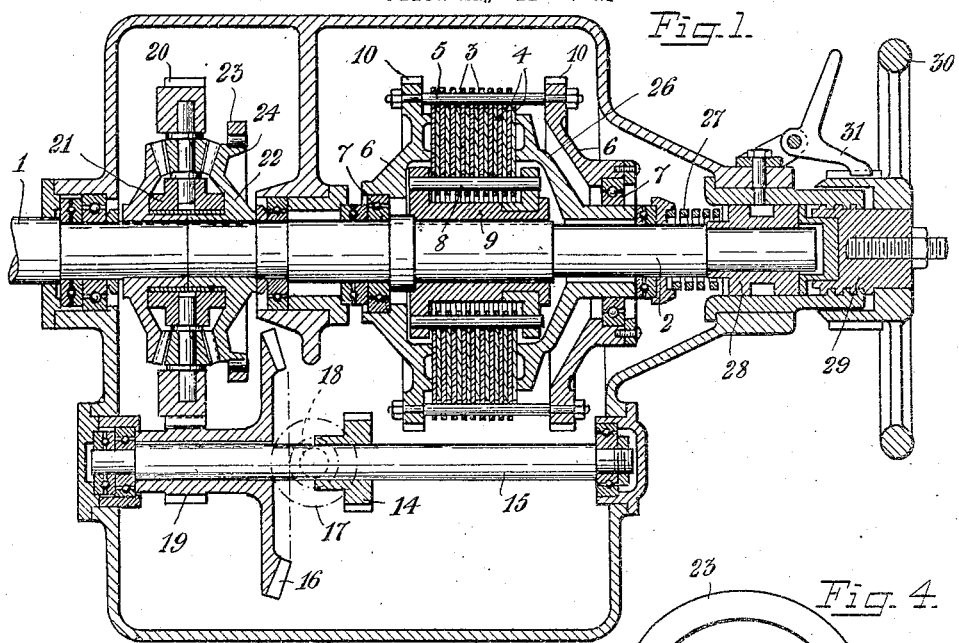
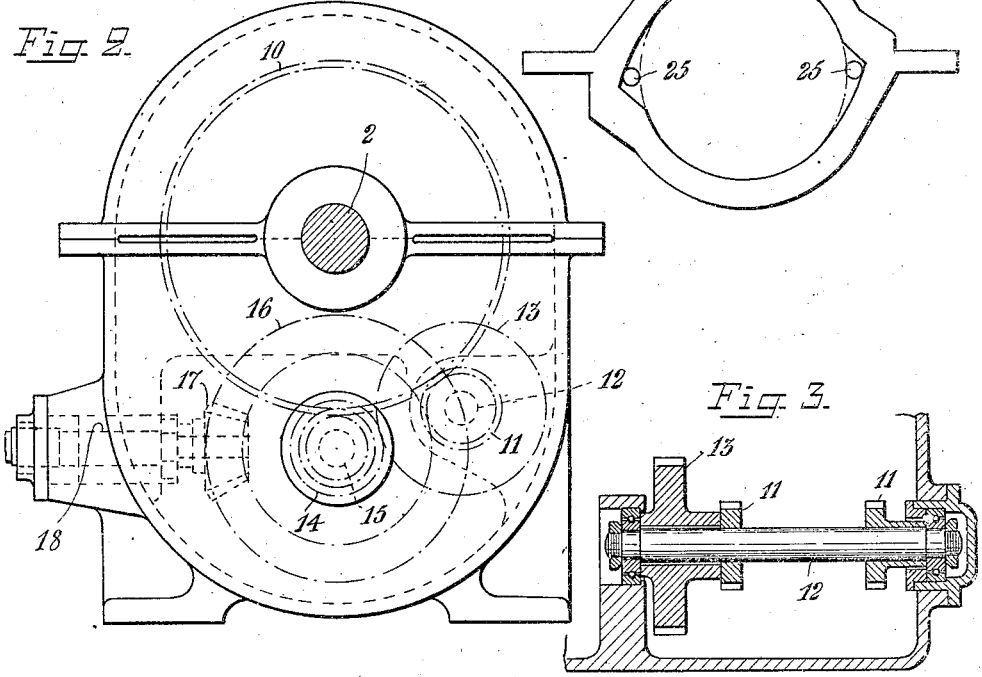
Inventor
E. A. Grafström
By Marks&Clerk
Attys.

Patented May 13, 1924.

1,494,065

UNITED STATES PATENT OFFICE.

ERNST ANDERS GRAFSTRÖM, OF STOCKHOLM, SWEDEN, ASSIGNOR TO ELECTRO-AGRI-CULTUR AKTIEBOLAGET, OF STOCKHOLM, SWEDEN, A CORPORATION.

FRICTION REGULATOR FOR WINDING DRUMS.

Application filed May 11, 1922. Serial No. 560,239.

*To all whom it may concern:*

Be it known that I, ERNST ANDERS GRAFSTRÖM, a subject of the King of Sweden, residing at Odengatan 32, Stockholm, Sweden, have invented certain new and useful Improvements in Friction Regulators for Winding Drums, of which the following is a specification.

For the control of the stretch in aerial cables for electrically driven tractors and similar machines, frictional apparatus have been used heretofore, in which a motor operable for the coiling up of the cable is driving a shaft, provided with friction members which, by friction, drive other friction members rigidly connected with the shaft to which the coiling drum of the cable is attached.

When using an arrangement devised as above, it will be found that certain movements of the cable, particularly on a momentary increase in the stretch thereof, bring about statical friction between the friction members. When the stretch of the cable is immediately thereafter increasing by reason of the coiling of the cable onto the cable drum, the statical friction will still be present, which, on the same having to be quickly overcome, causes so great a tension in the cable that the latter is apt to easily break.

Investigations made regarding the frictional effect at different relative speeds (called the frictional speed hereinbelow) between the friction members have shown that the friction of rest or statical friction is very much greater than when a motion is taking place between the friction members, and that, on the motion having attained a certain speed, the same may always be read off on the practically straight horizontal portion of the frictional curve, that is to say that, notwithstanding the varying movements in coiling and uncoiling the cable which necessarily must occur in apparatus of this description, the frictional effect will be practically constant, even on a considerable increase of the frictional speed beyond the above-mentioned speeds.

With this experience, it will thus be essential, partly to prevent the occurrence of statical friction between the friction members, and partly to so dispose those frictional speeds that are apt to occur, that the resulting frictional effect will be constant as far as possible.

To prevent friction of rest, trials have been made to drive the one friction member at a very great speed. This, however, not only causes two great a power consumption, but also development of heat to so considerable an extent that the frictional apparatus cannot operate by reason of this. Besides, there is no safe-guard under all circumstances against an occasional occurrence of statical friction.

In order to attain the above-mentioned desirable result, a friction brake has been constructed according to the present invention, said friction brake being so devised that the one friction member, or the one group of friction members thereof can move in one direction only, which preferably may be designated as negative, whereas the other member or other group of members is moving in the opposite, positive direction, and which, at most, is capable of standing still only momentarily, in which latter case the frictional speed between the members is still such as to make the relative motion between the members perceptible on the practically straight horizontal portion of the friction curve.

In other words, the invention may be said to be principally characterized by the friction members within the friction brake being driven in such manner as to move continually relatively to each other in opposite directions, or with the one member or group of members standing still.

The invention may be carried into effect in various ways. An embodiment suited for practical purposes is illustrated in the accompanying drawing. Fig. 1 shows the friction apparatus in its entirety, by way of a vertical, longitudinal section, and Fig. 2 shows the apparatus in an end view. Fig. 3 is a vertical section of part of the gearing, and Fig. 4 discloses a locking device.

According to the drawing, the apparatus is provided with two co-axially mounted shafts 1 and 2, the one of which, 1, carries the coiling drum (not shown in the drawing) while the other shaft 2 carries the friction brake. The latter consists of two groups of annular laminæ 3 and 4, the laminæ 3 denoted by full-drawn lines being rigidly connected with bolts 5 attached into the disks 6 which are rotatable on the bearings 7. The other group of laminæ 4 is connected with bolts 8, attached into the part 9 keyed onto the shaft 2. The disks 6 are formed at their circumferences into toothed wheels 10 co-operating with the pinions 11, which are attached onto the shaft 12 having also the toothed wheel 13 fastened thereto, said toothed wheel 13 co-operating with the shaft 15 through the medium of the pinion 14. Attached to the shaft 15 is the bevel gear 16 co-operating with the bevel gear 17 attached to the motor shaft 18. The bevel gear 16 is made integral with the pinion 19 co-operating with the outer toothed rim 20 in a differential gearing 21 arranged in a manner known per se. Arranged about the one gear 22 of the differential gearing is a ring 23 attached to the fixed casing of the apparatus (Fig. 4), a roller-locking mechanism with rollers 25 being provided between the said ring 23 and a corresponding projection in the gear wheel 22.

Shaft 15, driven by the motor shaft 18 by means of the gearing 16, 17, drives in turn, through the gearing 13, 14 and the gears 11, the group of laminæ 3 in a certain direction, designated here as the negative direction, whereas the group of laminæ 4 is driven in the opposite direction through shaft 15 and the gear 19 and the toothed rim 20 of the differential gearing, the said opposed direction, in which the shaft 1 with the coiling drum of the cable are also driven, being called the positive one. Consequently, the groups of laminæ in the friction brake must be in continual motion relatively to each other, whereby the friction of rest is thus prevented.

The differential gearing 21 connecting shafts 1 and 2 has then for its purpose to keep the frictional effect produced within the friction brake constant as far as possible. In case the speed of rotation of the coiling drum of the cable with shaft 1 should at any moment attain such a value with respect to the speed of rotation of the inner group of laminæ 4 attached to the shaft 2, that the latter speed of rotation will be reduced to or even fall below a certain minimum value, the locking device situated between the fixed ring 23 and the gear wheel 22 of the differential gearing will immediately act in such a manner that the gear wheel 22 is locked, together with shaft 2, a continued motion being thus maintained between the laminæ 3 and 4, so that friction of rest is prevented in this case, too.

In order to facilitate a control of the pressure between the friction laminæ 3 and 4, a disk 26 is displaceably mounted on shaft 2, said disk bearing against the outermost disk in the group of laminæ 4 under the action of a spring 27 coiled about the shaft 2, which spring abuts against a sleeve 28 adapted to be displaced to and fro on the shaft, such displacement being controlled by means of the screw 29, which is adapted to be rotated by means of the hand wheel 30. This hand wheel may be locked in its adjusted position by means of a catch 31.

As already set forth, the constructive embodiment of the arrangement may be changed in various ways beyond the examples shown and described herein. Referring particularly to the differential gearing, it may be constructed in many more ways than shown in the drawing, and it may, if found suitable, be replaced by any other gearing devised so as to be capable of imparting to the friction brake a practically constant frictional effect under the speed variations which are always apt to occur.

What I claim as new and desire to secure by Letters Patent of the United States is:—

1. A friction regulator for controlling the stretch in aerial cables for electrically driven tractors and the like, including friction members, and means for driving said members and causing the members to always move relatively to each other either in opposite directions or with one member standing still.

2. A friction regulator as claimed in claim 1 in which the driving means includes a shaft, means for positively driving one of said members from the shaft, and an intermediate gearing actuated by said shaft for moving the other friction member in the opposite direction to the positively driven friction member.

3. A friction regulator as claimed in claim 1 in which the driving means includes a driving shaft, a differential gearing driven by said shaft, a second shaft driven by said differential gearing and positively driving one of said friction members, and a coiling drum shaft also driven by said differential gearings.

4. A friction regulator as claimed in claim 3 in which the differential gearing includes a gear movable with the second shaft, a fixed ring surrounding said gear wheel, and a locking device arranged between the ring and gear wheel and adapted to lock the gear wheel when said positively driven friction member is rotating at a certain minimum rate of speed.

5. A friction regulator as claimed in claim 1 including a disk bearing against one of said friction members, a spring bearing against said disk, and means for tensioning said spring in order to control the friction between the friction members.

6. An apparatus of the class described including a driving shaft, a differential gearing driven by said shaft, a first shaft driven by said differential gearing, a positively driven friction member actuated by said first shaft, a second coiling drum shaft driven by said differential gearing, a second friction member cooperating with the positively driven friction member and rotatable in an opposite direction to the direction of movement of the positively driven friction member, means for driving the second friction member from the driving shaft, and locking means associated with said differential gearing for locking the said first shaft when the positively driven member is rotating at a certain minimum rate of speed.

In testimony whereof I affix my signature in presence of two witnesses.

ERNST ANDERS GRAFSTRÖM.

Witnesses:
S. SWENSON,
L. BERGONLINDE.